Figure 1:
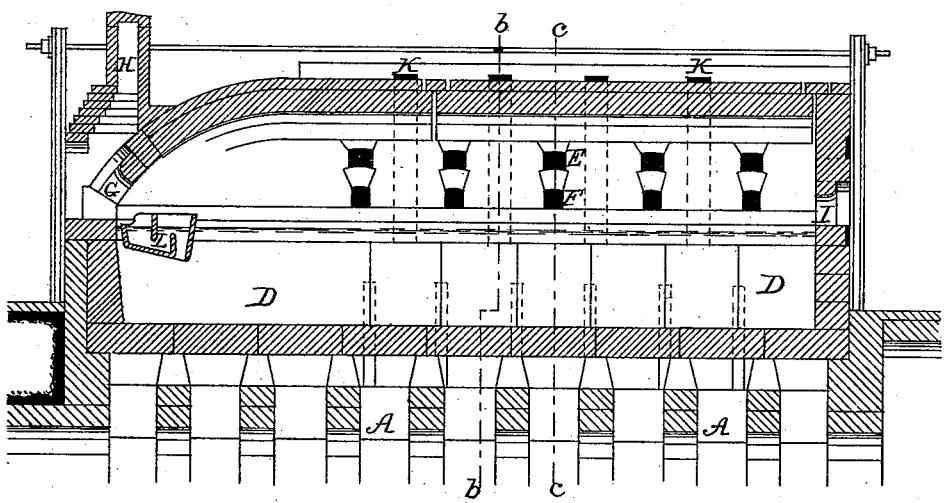

(No Model.) 2 Sheets—Sheet 1.

F. SIEMENS.
CONSTRUCTION AND METHOD OF WORKING GLASS MELTING FURNACES.

No. 261,054. Patented July 11, 1882.

Witnesses:
Daniel Breed
F. M. Burnham

Inventor:
Frederick Siemens
by C. S. Whitman
Atty (No Model.)  2 Sheets—Sheet 2.

F. SIEMENS.
CONSTRUCTION AND METHOD OF WORKING GLASS MELTING FURNACES.

No. 261,054. Patented July 11, 1882.

UNITED STATES PATENT OFFICE.

FREDERICK SIEMENS, OF DRESDEN, GERMANY, ASSIGNOR TO CHARLES WILLIAM SIEMENS, OF WESTMINSTER, ENGLAND.

CONSTRUCTION AND METHOD OF WORKING GLASS-MELTING FURNACES.

SPECIFICATION forming part of Letters Patent No. 261,054, dated July 11, 1882.

Application filed May 27, 1881. (No model.) Patented in England November 22, 1879, No. 4,763.

*To all whom it may concern:*

Be it known that I, FREDERICK SIEMENS, of Dresden, in the German Empire, have invented certain Improvements in the Construction and Method of Working Glass-Melting Furnaces, (for which Charles William Siemens, of Westminster, in the county of Middlesex, England, obtained Letters Patent for Great Britain, No. 4,763, bearing date the 22d of November, 1879, as a communication from abroad,) of which the following is a specification.

My invention relates to that class of glass-melting furnaces for which Letters Patent of the United States numbered 127,806 were granted to Charles William Siemens and Frederick Siemens, June 11, 1872, and to Charles William Siemens, August 3, 1880, No. 230,667; and the nature thereof consists in certain modifications in the details of the construction of such furnace, and novel methods of working the same, as hereinafter described.

The loss of time and other disadvantages resulting from the method of working glass-melting furnaces formerly in use were in a measure obviated by the new process and apparatus described in said Letters Patent No. 127,806, in which was described a regenerative tank-furnace for the continuous melting of glass, constructed with transverse partitions dividing the tank into compartments, through which the melted materials were made to flow successively, while the gas and air ports were arranged along each side of the tank, so as to play transversely across the same, as no time was lost in cooling and settling the metal and reheating the furnace, and an economy of labor was effected in lessening the number of workmen required for the melting operations.

The invention described in said Letters Patent No. 230,667 consisted in placing the regenerators at the sides of the tank and forming an open cave below the tank, communicating with air-spaces on each side thereof, for the purpose of cooling the bottom and sides and receiving such metal as might leak through in an open accessible space. Glass-melting tanks have hitherto been constructed under the belief that the fining operation of the material takes place mostly at the surface, and consequently such tanks have been made of considerable superficial area, but of very moderate depth, such as a foot or eighteen inches. In such tanks floating bridges or rings have been used, and these have been made shallow, so as only to exclude from the working-out spaces parted off by them foreign matters floating on the surface; also, boats or floating vessels for working out glass have been employed, as described in the specification of Letters Patent of the United States granted to Frederick Siemens on the 17th of April, 1877, No. 189,800, and reissued October 19, 1880, No. 9,418; but those boats were so constructed that the glass was made to enter them at a high level, where it would be in an imperfectly fined condition, unless the tank were provided with bridges or other means of separating the crude from the fined material. It has been observed, however, that in the glass-melting process the metal, as it fines, sinks below the surface, and consequently, in order to work out the metal to the best advantage, the depth of the tank should be very considerably increased, so that below the fluid molten metal there may be a layer of metal in a semi-fluid or partially-solid condition lining the tank; and the floating vessels used should be of such form and construction as to take their supply from a considerable depth below the surface of the metal.

According to the present invention for the melting, fining, and working out of glass, a continuously-working regenerative gas-furnace is employed, having a deep tank, in which there are boats or floating fining-vessels made of refractory material and provided with projecting horns, which serve as fenders to keep them from contact with the side of the tank. These boats or floating fining-vessels may be employed in tanks other than those worked on the regenerative-gas-furnace principle, and therefore form the subject-matter of another application for Letters Patent of the United States filed by me in the United States Patent Office.

Figure 2:
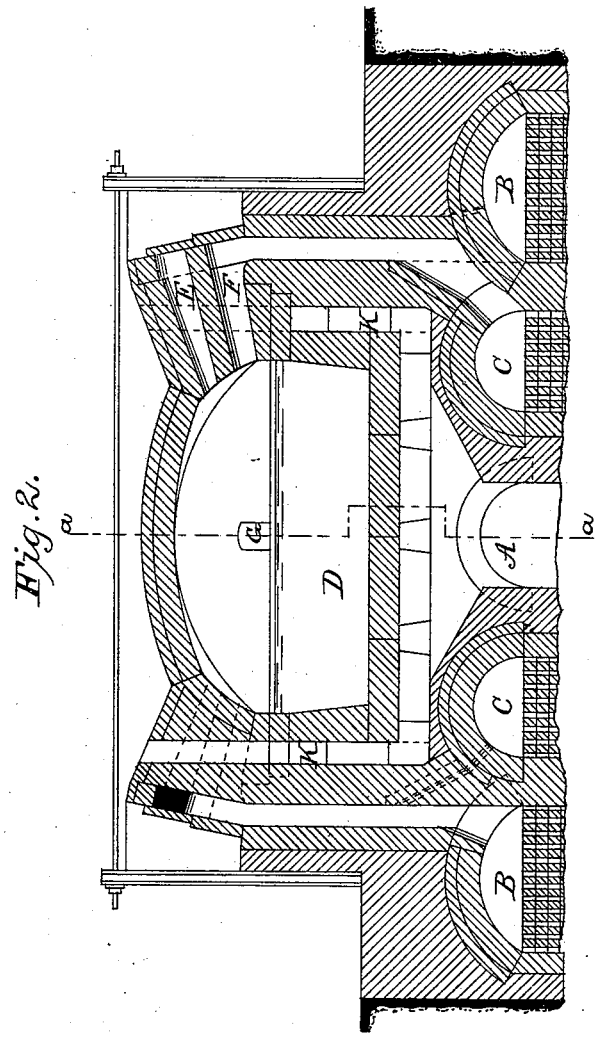

In the accompanying drawings, Figure 1 is a longitudinal section on the line $a\ a$ of Fig. 2, showing the construction of a deep glass tank furnace according to this invention. Fig. 2 represents two half transverse sections thereof, the left half on the line $b\ b$ and the right half on the line $c\ c$ of Fig. 1.

The furnace illustrated in Figs. 1 and 2 is quite similar in general construction to that described and claimed in said Letters Patent No. 230,667; but there is no bridge provided with passages for the molten metal separating the melting-compartment from the working-out compartment.

A is the cave, with the regenerative chambers B B for air and C C for gas arranged on each side of it and below the tank D.

E and F are flues conveying the heated air and gas up from the regenerative chambers on the one side, while the products of combustion pass down by corresponding flues to the regenerative chambers on the other side, this movement from time to time being alternated in the known manner according to which regenerative gas-furnaces are operated.

G is one of the working-out holes, of which a number are arranged at one end of the tank, each having a flue, H, to cause a draft of air for the protection of the workman.

I is one of the feeding-doors, of which there may be several at the end opposite to that where the glass is worked out. The bottom and sides of the tank are externally cooled by air-currents through and from the cave A and through flues K.

The tank D is made over eighteen inches in depth for the following reasons: In continuous-melting tanks shown in former patents, the surface of the metal subjected to the action of the flame was made considerable, in order to permit of the reactions taking place in the upper portion of the current traveling toward the working-holes. These dispositions appeared indispensable, for the lower portion of the metal in the tank is chilled by contact with the bottom, which is kept actively cooled by circulation of air to prevent leakage of the glass through the joints. By increasing the depths of the tanks to a sufficient degree while maintaining an active circulation of air beneath, the metal under treatment is maintained quite fluid to a depth of about eighteen inches, and it has been found not only possible but advantageous to reduce the surface metal subjected to the action of the flame, for the reason that the reactions among the particles occur in this case during their descent from the higher to the lower zones of fluid metal. This is particularly the case in bottle-glass furnaces, in which the finest glass always remains in the lowest zone, whence it is, according to the new arrangements, gathered by means of the floating vessels or other suitable means. In the fusion of window or other white glass there is a continuous descending and ascending movement of the particles throughout the mass, as is proved by the wearing away of the bottoms of shallow tanks. The advantage to be obtained from increasing the depth of these tanks will be the formation of a layer of chilled glass on the surface of the bottom, at which point the movement of the particles ceases, whereby the bottom blocks will be protected from wear, the presence of stones in the glass avoided, and a larger proportion of first-quality glass will be produced. It is also to be observed that by this construction the reduced surface of the tanks exposed to flame is accompanied with additional economy of fuel, owing to the diminished surface for loss of heat by conduction.

Tank-furnaces have been heretofore constructed of considerable depth; but these furnaces were adapted to the old and well-known intermittent process, which consisted in charging the batch into pots or into a tank, fusing the same, fining the product, and finally gathering the metal for working. In conducting this process the tank was quite emptied at every gathering of the metal, and the series of steps above mentioned usually consumed twenty-four hours, during which time the furnace was subjected to alterations of temperature, involving waste of fuel, and causing expansion and contraction of the brick-work and much "wear and tear." These tanks were worked in the same manner as pots, and, like the latter, were made of various depths, according to the fancy of the designers. The tank described in my present application is adapted to a different process, which consists in the continuous production of glass by charging the batch, fusing it, fining the product, and gathering the glass for working into shapes while the tank is maintained full of metal. These operations are carried on uninterruptedly and simultaneously while the furnace is kept at a uniform temperature, and thus a saving in fuel is attained, wear and tear of the furnace prevented, and an improvement made in the quality of the product.

My present invention is not claimed to be applicable to tanks operated as pots have been heretofore worked—that is to say, emptied, or nearly emptied, at every gathering of glass—but is limited to tanks, or pots operated as tanks, which are always kept full, or nearly full, of metal, and to furnaces in which the several operations of fusing the batch, fining and gathering the metal may be carried on simultaneously while the tanks are maintained full, or nearly full, of metal.

I claim and desire to secure by Letters Patent—

A tank for the continuous melting of glass, having gas and air ports, and of the depth herein described, for the purpose of forming below the upper fluid portion of the metal a layer of metal in a semi-fluid or partially-solid condition, as and for the purposes described.

FREDERICK SIEMENS.

Witnesses:
 RUDOLF LIEBIG,
 LÉON KLEMPERER.